United States Patent Office 3,378,401

Patented Apr. 16, 1968

3,378,401

PROCESS FOR THE FORMATION OF VISIBLE IMAGES ON A SUBSTRATE

Alfred F. Kaspaul and Erika E. Kaspaul, Fairview, Pa., assignors to Minnesota Mining and Manufacturing Company, St. Paul, Minn., a corporation of Delaware No Drawing. Filed Feb. 11, 1964, Ser. No. 343,953
5 Claims. (Cl. 117—212)

ABSTRACT OF THE DISCLOSURE

Process for the formation of visible images on the surface of thermally stable substrates, consisting in producing an invisible latent image by impingement of an electron beam upon said substrate while in contact with the vapor of a photolytically or heat decomposable metallic compound, and thereafter, with or without removing said metallic compound, vapor depositing upon the latent image thus produced organic, inorganic or metallic developing agents to produce a visible image corresponding to said latent image. When metallic or semi-conducting compounds are employed, electronic circuits or components are provided.

This invention relates to methods for forming visible images upon substrate surfaces involving the selective deposition of metal or other developing material vapor upon preformed latent images.

More particularly, this invention relates to methods for forming visible images which comprises producing an invisible latent image of metallic nuclei upon a substrate surface, thereafter developing the so produced latent image into a useful form by selective vapor deposition of anothed material having a lower heat of sublimation than the material used to form the latent image.

It is an object of the invention to provide a method for the production of latent images on which can be selectively deposited a developing agent, such as metals, metal chalcogenides, dyes, etc., for recording and reproduction of images and information.

Another object of the invention is to provide a method for the production of electronic microcircuitry.

Other objects will be apparent from the disclosure hereinafter made.

Broadly speaking, in carrying out the invention, an invisible latent image in desired form is produced upon a surface of a thermally stable substrate. The latent image is developed in vacuo by exposing the surface, bearing the latent image, to vapor of a normally solid material. The vapor is selectively and preferentially deposited upon the latent image, and a visible image is produced.

The latent image apparently provides nuclei upon which amounts of the developing agent collect to form a visible or otherwise detectable image. Each individual nucleus seemingly is able to collect many atoms of developing agent, so that an amplification of the image results.

The substrates which are useful in practicing the invention are those which are stable at the temperature selected for development, at the pressures which are employed. For production of mircrocircuitry, they are preferably materials having (a) high dielectric strength, (b) low power factor, and (c) having at least one surface substantially free of materials with nucleating properties. For recording information, (a) and (b) are not essential.

Preferably substrates which are in sheet or film form are employed. Dielectric materials are used when electronic circuit elements are to be produced. Substrate materials such as mica sheets, Teflon, ceramics (e.g. barium titanate, steatite); polyester films, glass, or a more complex material, such as a semiconductor film on a ceramic or mica sheet, e.g., germanium, silicon, cadmium sulfide, on at least a portion of a metallic strip or a ceramic, glass or mica base layer, are illustrative. Wherever complex substrates are used, of course, the temperatures employed are limited to those which do not damage the semiconductor properties.

The latent image according to the present invention is produced by electron beam impingement on a surface which is in contact, under conditions of equilibrium, with the vapor of a photolytically or heat-decomposable metallic compound, e.g., a metal carbonyl, metal polyhalide, metal nitroxyl, metal nitrosylcarbonyl, metal alkyl, metal hydride or the like, which are convertible to gas or vapor form under the conditions of pressure herein employed and at temperatures below the decomposition temperature.

For producing desired configurations of marks, characters, numbers or even circuit wiring diagrams, the electron beam which produces the latent image can be made to operate through a mask, or by scanning and modulating as in the cathode ray tube used for video picture formation.

The entire process including latent image formation and development is carried out in an atmosphere of greatly reduced pressure. Ordinarily, pressures of $10^{-2}$ to $10^{-4}$ mm. Hg are satisfactory. The atmosphere can be gases such as argon, nitrogen, hydrogen, etc., or mixtures thereof.

In the latent image forming operation, vapor of the metallic compound, say nickel carbonyl (heating means may be needed with less volatile substances) is introduced into the work chamber close to the surface of the substrate, and the vapors are permitted to be absorbed over the whole area of the surface where the latent image is to be formed. At the low pressures employed, not much of the materal will be present, but even small concentrations are sufficient to produce the required latent image. The substrate surface is concomitantly scanned with a modulated electron beam of small area, or a broad beam of electrons impinged on the surface through a mask, to produce the latent image. The impingement of the electron beam on the material in contact with the surface decomposes or reduces the metal compound to the free metal, which remains on the surface as a "nucleating" latent image.

The actual quantity of metal required to be formed upon the surface to produce the latent image is extremely small, and is probably not an accurately measurable amount. The image is therefore ordinarily invisible. The metal for the latent image is selected to have a heat of sublimation greater than the material which is to be used for development. (While heat of vaporization might be used in making the determination or calculation in connection with the system, the heat of sublimation is believed to be more accurate for use in low pressure systems.) It is also preferred that the material used to form the latent image does not dissolve into the substrate at operational temperatures.

The actual time needed to form the latent image varies widely from material to material, and it is not possible to give a single time limit suitable for all of them. In general, however, empirical methods will give useful results which can be duplicated if the same conditions are used.

Nickel carbonyl, iron carbonyl, niobium pentachloride, tungsten carbonyl and the like vaporizable metal polyhalides or metal-organic compounds are useful. Useful metals which may be deposited from their metallic carbonyl compounds are chromium, molybdenum, cobalt, tellurium, rhenium, and the like. Illustrative compounds of other types of metal compounds useful in the process of the invention are nickel acetylacetonate; chromium-dicumene; nitroxyls, such as copper nitroxyl; nitrosyl carbonyls, for example, cobalt nitrosyl carbonyl; hydrides, such as tellurium hydride, selenium hydride, antimony hydride, tin hydride, chromium hydride; the mixed organo-metallo hydrides such as dimethyl alumino hydride; metal alkyls such as tetraethyl lead; metal polyhalides such as chromyl chloride, titanium tetrachloride, etc. and metal carbonyl halogens such as rhodium carbonyl chloride, osmium carbonyl bromide, ruthenium carbonyl chloride; and the like. Such compounds with metals which have high heats of sublimation are preferred latent image formers.

The latent image thus formed is quite permanent and may be stored for later development if desired. Development can take place immediately after, or even at the same time as formation of the latent image, i.e., the nucleation sites.

Materials selected from the group consisting of zinc, cadmium, magnesium, copper, silver, and the like, or lead oxide, lead sulfide, cadmium sulfide, cadmium selenide, antimoy trisulfide and bismuth oxide are preferably used in the development to form the visible images.

In one aspect of the development step, the remaining gaseous metallic compound is removed, and the surface bearing the latent image is exposed to vapor of the selected developing substance, usefully selected from Table I, having heat of sublimation smaller than the material which forms the latent image. The exposure time depends on the vapor pressure and the temperature of the substrate.

As in the case of the latent image, it is not possible to give an exact time needed to form the visible image. This is because such time is affected by a number of different variables, including concentration of vapor of the material used, the nature of the substrate and latent image, degree of contrast desired in the visible image, and other subjective and objective variables. In general, however, the deposition is conducted at least for a time sufficient to develop the latent image to the point where it is optically visible. The purpose to which the developed image is to be employed and similar considerations may require deposition of more developing agent in some cases than in others after the latent image once becomes visible. For electronic circuit elements, the electrical conductivity can be adjusted as desired by depositing metal of greater or less thickness, or by employing an oxidizing atmosphere so as to form an oxide (e.g., tin oxide) of greater resistance, thus producing a thin film resistor.

In another aspect of the process of the invention, the development step can be carried out simultaneously with the latent image formation. In this case, vapors of the developing material are present adjacent to the surface of the substrate, together with the gaseous, heat or light decomposable metal compound. An advantage of the combined latent image formation and development is the very much thicker layer of developing material which can be obtained. New nuclei for condensation of developing agent are apparently disposed more or less continuously on top of the developed image. Thicker image layers are desirable where electronic circuitry is produced, to serve as conductors, connectors, low-resistance elements, etc.

The development can be carried out with the substrate surface at room temperature. It has been found, however, that when the substrate surface bearing the latent image is heated to a temperature in the range of about 100 to 1000° C. during development, better contrast and definition is obtained with developer material having a $\Delta H_s$ value >50 kcal./mole.

The following table lists materials useful for formation of latent images, and for developing these at various surface temperatures.

TABLE I

| Latent Image Former | | | Development | |
|---|---|---|---|---|
| Metal Compound | Metal nuclei formed | $\Delta H_s$ in kcal./mole | Material | $\Delta H_s$* in kcal./mole |
| Nickel carbonyl | Ni | 101.2 | Zn | 31.0 |
| Iron carbonyl | Fe | 99.0 | Cd | 27.0 |
| Tantalum pentachloride | Ta | 186.0 | Ba | 41.0 |
| Chromic chloride | Cr | 94.9 | | |
| Tungsten hexachloride | W | 200.0 | Pb | |
| Vanadium tetrachloride | V | 122.7 | Sn | 72.0 |
| Silicon tetrachloride | Si | 107.0 | Ag | 68.2 |
| Tetramethyl silicane | Si | | Cu | 81.0 |
| Chloromethyl | Si | | | |
| Boron trichloride | B | 128.0 | Au | 84.7 |
| Diborane | B | | | |
| Triphenyl borane | B | | Bi | 47.5 |

* $\Delta H_s$ value is preferably at least about 15–20 kcal./mole smaller than the $\Delta H_s$ value for the nucleating metal. Trial and error determinations suffice if the value is unknown, because the absolute values are not critical.

The temperature at which maximum selectivity of deposition occurs, that is, the substrate surface temperature at which the best definition and greatest clarity of developed image is produced, varies with a number of different factors, such as type of substrate, type of nucleation sites in the latent image, material being used to develop the latent image, etc., so that it is not possible to give offhand the optimum substrate temperature for every combination of variables. Generally, however, materials with greater heat of sublimation develop latent images of much better contrast when the substrate surface is maintained at 500–600° C. This apparently hinges on the fact that at lower temperatures such substances tend to condense all over the substrate, thus causing a high background level.

Furthermore, it has been found that the latent images can be developed by any of a very wide variety of nonmetallic materials, including metal-chalcogenide compounds, such as: $Bi_2O_3$, PbS, CdS, $CdS_e$, $CdT_e$, $Sb_2S_3$. Even organic dyestuffs, such as the phthalocyanine dyes, can be selectively deposited upon a substrate bearing latent images according to this disclosure. In general, any material may be selectively deposited upon such substrates bearing latent metallic images provided that it is vaporizable and has a heat of sublimation smaller than the latent image nucleation sites. The optimum temperature for a given system is determined by simple experiment or by calculation.

The rate of condensation is believed to be expressed by the following equation:

$$\frac{dN_{ad}}{dt}=\dot{N}_i-\dot{N}_e=\dot{N}_i-N_{ad}\cdot A\cdot \exp\left(-\phi_{ad}/RT\right) \quad (1)$$

where $\phi_{ad}$ represents the adsorption energy between a single atom and the surface and is assumed to be about ⅙ of the heat of sublimation; (T), the absolute temperature in degrees Kelvin; (R), the gas constant (1.9878 cal.·deg.$^{-1}$·mole$^{-1}$); and (A), a more or less temperature independent constant (for zinc about $10^{14}$ at room temperature).

$\dot{N}_i$=rate of incident atoms $\dot{N}_e$=rate of reevaporating atoms ($N_e=N_{ad}\cdot A\cdot \exp(-\phi_{ad}/RT)$)

$N_{ad}$=number of adsorbed surface atoms

So that:

$$\dot{N}_i=N_{ad}\cdot A\cdot \exp\left(-\phi_{ad}/RT\right) \quad (2)$$

and converting to logarithms of base 10:

$$\log \frac{\dot{N}_i}{N_{ad}}=\log A-(0.434)\cdot(\phi_{ad}/RT) \quad (3)$$

It is understandable from Equation 3 that if $\phi_{ad}$ of the developing vapor is doubled then the subtrate surface temperature has to be doubled to obtain the same numbers of atoms deposited.

While reference is made to the heat of sublimation ($\phi_{ad}\sim\frac{1}{6}\Delta H_s$), because this is a useful and convenient criterion for selection of the materials to be used, it will be apparent that surface energies or energy of adsorption (sticking coefficients) are involved. The substrate surface temperature and its surface adsorption energies affect the choice of materials to be used for vapor coating as well as the true temperature of the impinging beam. In general, the depositing material used should have a heat of sublimation which is not greater than that of either the substrate surface or the nucleation sites on this surface.

As used in this application the terms "heat of sublimation" and "$\phi_{ad}$ energy of adsorption" have their conventionally recognized meanings. Thus the term "heat of sublimation" refers to that quantity of heat required to convert a definite amount of material under atmospheric pressures into the gaseous state. Heats of sublimation are conventionally given in kilocalories per mole, and, since one atom has about six next neighbors on the surface, such values must be divided by six to find the value of $\phi_{ad}$ in kcal. per mole. Similarly, the term $$\log \frac{\dot{N}_i}{N_{ad}}$$

has reference to the ratio of the number of atoms incident per unit area and time upon a surface compared to the number of atoms adsorbed (sticking) to such surface per unit area at equilibrium.

In any case, however, it is of course to be understood that applicants are not bound by any theories set forth herein, as the process of the invention can be carried out reproducibly without reference thereto.

It is preferred that the substrate surface be substantially non-porous (i.e. continuous) because it has been found that such non-porosity promotes the production of images of good optical properties. It is also preferred that the substrate be one which is substantially thermally stable, by which it is meant that the surface should best be substantially non-volatile under the temperature and pressure conditions employed, that is, the substrate can be subjected to the desired temperatures even under high vacuum conditions without undergoing appreciable chemical or physical changes which would alter the surface receptivity.

It is preferred to conduct all of the steps of the process of this invention as a part of a single operation. However, it is not necessary or critical to conduct the individual steps continuously. Thus, for example, a recording of the latent image can be stored after its formation. A latent image can be formed upon a tape, the tape stored, and then subsequently developed as by selective vapor deposition, as described.

In one aspect the invention touches on the storage or reproduction of information. In this case, in general, sufficient developing vapor is deposited to produce an image which can be read out electronically, optically or even magnetically, if the developed image has sufficient conduction and/or magnetic susceptibility.

A particularly useful application of the invention is in the production of microcircuit components, such as resistors, conductors forming part of an electronic circuit subassembly, and the like.

The following examples which are non-limiting as to the scope of the invention will illustrate the process and the devices produced thereby.

EXAMPLE 1

An element suitable for use in a microcircuit is prepared as follows:

A sheet of mica or ceramic about ½ inch square is placed in a vacuum chamber containing suitable electrodes and filaments, and other devices for carrying out the operations required. The mica sheet is supported upon a heating stage, which is adjustably and thermostatically controlled to maintain desired temperatures.

While maintaining the mica sheet above ambient temperature, it is subjected to a glow discharge or an electron beam bombardment to clean the surface. The pressure in the chamber is then adjusted to about $10^{-6}$ torr, and a mask having a slit cut therein in zigzag or other fashion is placed over the cleaned mica surface. Such a mask is conveniently made of Monel or other suitable material. With the mask in place, nickel carbonyl vapor is admitted to the chamber from a vessel connected to the chamber by glass tubing and a stop-cock. A broad electron beam is then directed to the area covered by the mask to create an invisible latent image composed of nickel atoms upon the surface of the mica not covered by the mask. The electrodes and the mask are then removed, and any remaining nickel carbonyl is pumped away by reducing the pressure to $10^{-6}$ torr, and the mica sheet is heated to approximately 500° C. While held at this temperature, and maintaining now a pressure of $10^{-4}$ torr with argon-hydrogen mixture (controlled leak), a set of electrodes bridged by a tungsten tube in which is contained either bismuth or bismuth oxide is placed opposite to the surface of the mica. The tungsten filament is energized and bismuth or bismuth oxide is evaporated, whereupon the vapors condense preferentially and selectively as bismuth oxide upon the latent image on the mica sheet. A zigzag bismuth oxide ($Bi_2O_3$) image is formed, corresponding to the shape of the opening in the mask. At a pressure of about $10^{-6}$ torr a lower bismuth oxide ($BiO$) is formed, rather than $Bi_2O_3$.

The bismuth or bismuth oxide element thus formed functions as a magneto-resistor. If connections are made to the ends of the image as soon as visible, a measurement of the resistance can be obtained while the image is being produced in the vacuum chamber. When the resistance has reached the desired point, evaporation of bismuth is discontinued. Such a thin film resistor can be employed in electronic devices in known manner.

The procedure is repeated using the same apparatus, except that the latent image is developed with zinc, and development takes place concomitantly with the impingement of the electron beam and in the presence of the nickel carbonyl and residual oxygen. By concomitantly exposing the substrate to the electron beam to form the latent image and also to the zinc vapor, a film of zinc of about 1000 A. thick or thicker is produced in the unmasked areas.

A more adaptable procedure for producing electronic circuitry, especially microcircuitry, is to fit the apparatus with control grids and deflection coils, to modulate the electron beam which in turn is controlled by a video camera and associated circuitry. The camera is focused on a line drawing depicting a resistor of suitable (zigzag) shape. The modulated electron beam is scanned over the surface of the mica sheet, or a barium titanate or other ceramic, e.g., alumina, plate. The combined exposure and development with zinc produces after deposit of about 100 micro-coulombs/cm.$^2$ a zinc resistor having resistance of about 10 ohms/sq.

EXAMPLE 2

Reproduction of printed matter, or other information including such as encoded information for use with computer storage means, can be accomplished by the process of the invention as follows:

A solid substrate material, usefully in tape or strip form, is placed in an apparatus containing a supply reel, a takeup reel and a number of intermediate operating stations at which the various steps in the process are carried out. The whole device is adapted to be kept under reduced pressure, and in appropriate places, partitions are provided with slits through which the strip form record medium passes. These partitions prevent the deposition of metallic or other materials in unwanted areas, such as upon the interior of the apparatus and so on. Connections for pumps, supply of electric current and sources of metal ions, electron beams, vapor deposition of oxides and metals and other required mechanical arrangements are provided. The pressure in the system is maintained at about $10^{-2}$ mm. Hg, or lower.

At the first station, the tape, which may be a high-temperature plastic material which is transparent, for example, Mylar or other high temperature resistant material, including Teflon and the like; or a metallic strip, for example, an aluminum strip bearing a surface layer of glass or mica paper adhered thereto, is exposed to vapors of iron or nickel carbonyl. The vapors of the material are confined to the area near the surface of the tape by internal partitions in the apparatus, and separate pump lines to the chamber, with a low-temperature (liquid nitrogen) trap in the line to avoid contamination of the pumps by carbonyl vapors, carbon monoxide and carbon dioxide.

An electron beam which is scanned and modulated according to the intelligence which is to be recorded is employed to produce the invisible image. It will be apparent that the size of the image can be varied from the size of the original. A suitable electron beam is produced using an electron gun of the type commonly employed in video display tubes, the voltage being about 15,000 volts and a beam current of about 50 microamperes being employed. The electron gun is controlled by a video camera and associated circuitry to scan and modulate, producing video frames of $\frac{1}{60}$ sec. each, interlaced. Exposure for about $\frac{1}{30}$ second is sufficient to form a latent image, which is of course invisible.

The substrate bearing the latent image is then moved from the image-forming station to the developing station, where it is exposed to vapors of a suitable developing metal, for example cadmium, zinc, bismuth or the like. During the coating operation, a substage heater under the tape, or alternatively infrared surface heating means, can be used to bring the surface temperature of the tape to a temperature from about 100 to 500° C. if the tape has a metallic backing and mica face, or a temperature of the order of about 200° C. if Mylar is used. Alternatively, the ambient temperature in the apparatus, ordinarily about 30 to 50° C., is employed. A sufficient amount of cadmium or zinc vapor is deposited upon the latent image to render it visible.

The substrate strip is then passed out of the development zone and to the storage reel. If desired, the strip can be moved continuously, while the electron beam is employed only to sweep transversely across the tape. It will be apparent that continuous recording is thus accomplished. To produce optically useful images, a deposit of metal of the order of about 100 Angstrom units thick is made upon the latent image. This provides excellent visual contrast. By use of the elevated substrate temperature for developing materials other than zinc and cadmium during the deposition step, the images produced are very much sharper and more uniform than those produced when heating is omitted.

What is claimed is:

1. In the process for the formation of images of predetermined configuration on the surface of a substrate by means of vacuum deposition of image-forming material, the improvement which comprises impinging an electron beam upon selected areas of said surface while said surface is in contact with the vapors of a heat-decomposable metal organic compound and with vapors of a normally solid visible image-forming material of the group consisting of metals, metal chalcogenides and phthalocyanine dyes, said materials being non-reactive with said metal-organic compound and having heat of sublimation lower than that of the metal contained in the said metal-organic compound, at a pressure of the order of $10^{-2}$ to $10^{-4}$ mm. Hg, thereby to bring about formation of a normally invisible latent image by decomposition of the metal-organic compound consisting of metallic nuclei and simultaneously depositing upon the said latent image the said normally solid material, and continuing deposition of said latent image concomitantly with and during the time that said image-forming material is deposited, whereby the visible image produced is of improved thickness.

2. The process according to claim 1, in which the normally solid developing material is an electrically conductive material.

3. A process according to claim 1, in which the metallo-organic compound is nickel carbonyl.

4. The process according to claim 2, in which the metallo-organic compound is nickel carbonyl.

5. The process according to claim 2, in which the normally solid developing material is a metal.

References Cited

UNITED STATES PATENTS

| | | | |
|---|---|---|---|
| 2,883,257 | 4/1959 | Wehe | 117—71 X |
| 2,913,357 | 11/1959 | Ostrofsky et al. | 117—107.2 X |
| 3,018,194 | 1/1962 | Norman et al. | 117—107.2 |
| 3,056,881 | 10/1962 | Schwarz | 117—212 |
| 3,119,707 | 1/1964 | Christy | 117—212 X |
| 3,140,143 | 7/1964 | Kaspaul et al. | 117—1.7 X |
| 3,234,044 | 2/1966 | Andes et al. | 117—212 |
| 3,239,374 | 3/1966 | Ames et al. | 117—212 |
| 3,243,363 | 3/1966 | Helwig | 117—107.2 X |

OTHER REFERENCES

Holland: "Vacuum Deposition of Thin Films," 1956, John Wiley and Sons, New York, N.Y., p. 257.

WILLIAM D. MARTIN, *Primary Examiner.*

E. J. CABIC, *Assistant Examiner.*